_United States Patent_ [19]

Hochberg et al.

[11] 3,830,261

[45] Aug. 20, 1974

[54] SELF-SEALING HOLLOW BODY FOR CONTAINING FLUIDS

[75] Inventors: Marvin S. Hochberg, Creve Coeur; Erwin K. Welhart, Florissant; James H. Pousson, St. Charles City, all of Mo.

[73] Assignee: McDonnell Douglas Corporation, St. Louis, Mo.

[22] Filed: June 22, 1972

[21] Appl. No.: 265,214

[52] U.S. Cl............... 138/127, 138/141, 220/63 A
[51] Int. Cl............................................. F16l 9/14
[58] Field of Search............. 138/97, 140, 141, 143, 138/153, 124–127; 161/405; 220/63 A

[56] References Cited
UNITED STATES PATENTS

| 2,076,729 | 4/1937 | Kennedy | 138/126 |
|---|---|---|---|
| 2,308,342 | 1/1943 | Wilitinson et al. | 138/133 |
| 2,429,688 | 10/1947 | Hoover | 220/63 |
| 2,439,366 | 4/1948 | McLaughlin | 220/63 |
| 2,439,562 | 4/1948 | Cunningham | 220/63 |
| 2,601,525 | 6/1952 | Howald et al. | 220/63 |
| 2,715,085 | 8/1955 | Boger | 220/63 X |
| 2,973,293 | 2/1961 | Schofield | 161/405 X |
| 3,698,587 | 10/1972 | Baker | 220/63 X |

_Primary Examiner_—Herbert Goldstein
_Attorney, Agent, or Firm_—Gravely, Lieder & Woodruff

[57] ABSTRACT

A hollow body, such as a metal fuel line, has a hollow imperforate core through which fuel flows or is contained. This core when penetrated by a projectile will tend to flare outwardly or "petal" at the exit hole left by the projectile. To retard or accommodate this petalling the core is surrounded by a layer of a material which may be either a braided fibrous overwrap or a foam material of very low density, or a combination of the two. Surrounding the inner layer is a resilient sealant layer, and the sealant of that layer reacts with the exiting fuel such that it expands and seals the hole left by the penetrating projectile. The sealant is encased in a protective outer overwrap of braided fiber strands applied around the sealant and embedded in a suitable matrix. The protective overwrap is quite rigid and contains the sealant. The overwraps are applied by braiding, and enhance the survivability of the hollow body in the event it is penetrated by a projectile.

5 Claims, 4 Drawing Figures

PATENTED AUG 20 1974 3,830,261

SELF-SEALING HOLLOW BODY FOR CONTAINING FLUIDS

BACKGROUND OF THE INVENTION

This invention relates to hollow bodies and, more particularly, to self-sealing hollow bodies for conveying or containing fluids.

In military aircraft the fuel lines are usually encased in a sealant material to prevent the loss of fuel when penetrated by a bullet or other projectile. The prevention or minimization of fuel loss is essential to reduce the hazards associated with the spillage of a flammable liquid. The typical fuel line consists of a metal tube and a layer of natural gum rubber sealant enveloping this tube. Several layers of tire cord are provided to retain the sealant in place and to maintain it in a state of compression. A projectile passing through the fuel line will of course penetrate both the sealant and the metal tube. The entry of the projectile into the fuel line does not cause much problem for the projectile merely slices and spreads the sealant and thereafter pierces the wall of the metal tube, causing some of the metal to flare inwardly. Once the projectile clears the sealant, the sealant merely reverts to its original shape due to its resilient physical properties. Some fuel also flows out of the hole in the metal tube, and this fuel causes the sealant to become tacky and swell. Hence, the entry hole is effectively sealed.

However, as the projectile leaves the fuel line it will flare or distort the wall of the metal tube outwardly, or more specifically, the impact of the projectile coupled with the hydraulic ram effect creates swelling of the tube an causes local distortion at the exit hole. Sometimes cracking also occurs around the exit hole. The distortion and petalling of the displaced metal spreads the sealant away from the exit hole. Petalling is sometimes called flowering, inasmuch as the flared metal bears a resemblance to flower petals. Since the flared metal spreads and holds the sealant away from the exit hole, much of the sealant is rendered ineffective and consequently the layer of sealant must extend outwardly beyond the greatest extent of the petalling. Indeed, 60-70 percent of the sealant thickness merely serves to accommodate the petalling of the metal, while the remaining sealant expands to seal the exit hole after the projectile leaves the fuel line.

Sealants currently used for fuel lines are quite dense, ranging in density from 30–95 lbs./ft.$^3$, and accordingly a significant weight penalty is imposed by the sealant material which is necessary to offset the effects of the petalling. Since the fluid lines of high performance jet aircraft often range up to three inches in diameter and the sealant thickness is normally about 0.4 inches, this weight penalty is a significant consideration.

SUMMARY OF THE INVENTION

One of the principal objects of the present invention is to provide a light weight hollow body which seals itself after being penetrated by a foreign object. A further object is to provide a self-sealing hollow body which experiences a minimal amount of petalling upon being penetrated by a projectile. An additional object is to provide a hollow body which is ideally suited for use as a fluid line or a fuel tank in a military aircraft. These and other objects and advantages will become apparent hereinafter.

The present invention is embodied in a hollow body including an imperforate core in which a fluid flows or is contained, an inner layer surrounding the imperforate core for reducing or accommodating petalling of the core upon the passage of a projectile through the core, a sealant surrounding the inner layer, and a braided fibrous outer layer surrounding and constraining the sealant. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
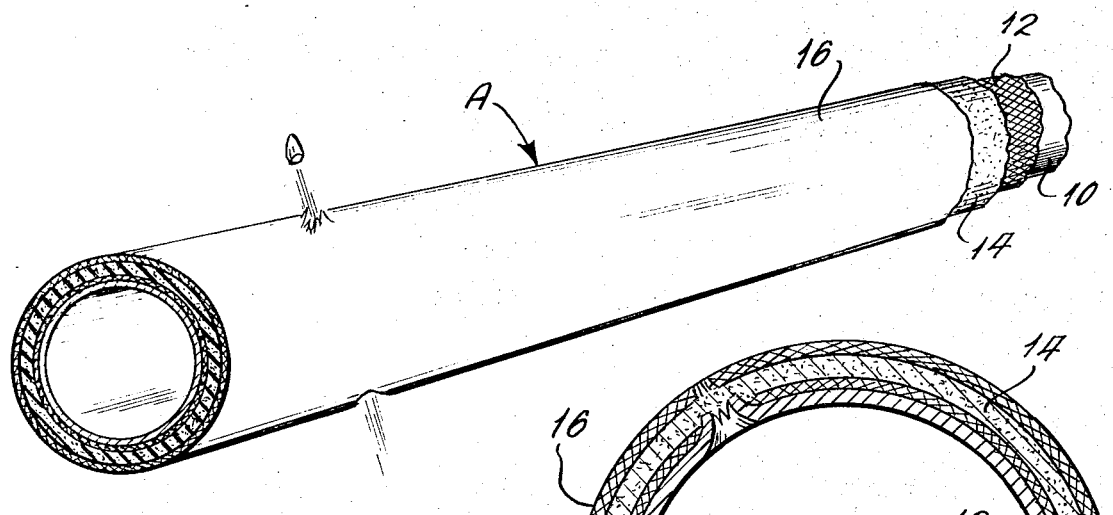
FIG. 1 is a perspective view of a hollow body constructed in accordance with the present invention and showing a projectile passing through the body to form a hole therein.
Figure 2:
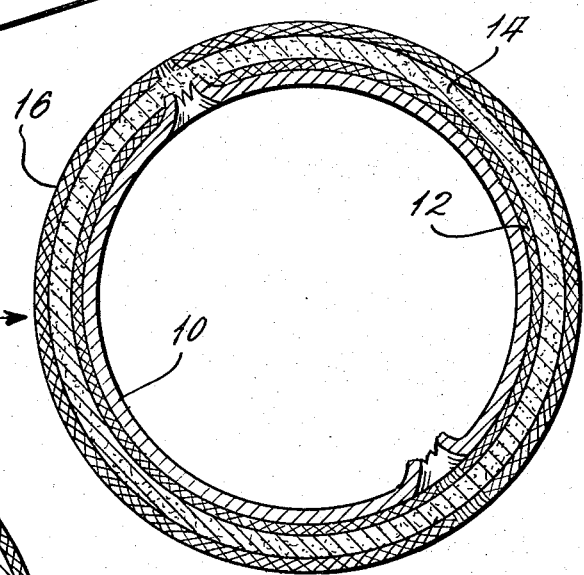
FIG. 2 is an enlarged sectional view of the hollow body illustrated in FIG. 1.

Referring now to the drawings (FIGS. 1 and 2), A designates a hollow body in the form of a fuel line having a hollow interior defined by a hollow imperforate core or tube 10. Aluminum is ideally suited for the tube 10 in view of its light weight and availability, although other metals such as stainless steel and titanium may also be employed. The tube 10 may also be a plastic extrusion.

The tube 10 is encased in an inner overwrap 12, and this overwrap is formed from strands or roving of fibrous material possessing high strength and stiffness. Strands of fiber glass, dacron, rayon, nylon, graphite, and PRD–49 (an organic fiber manufactured by DuPont), are all suitable for use in the inner overwrap 12. The strands of fibrous material are braided directly over the exterior surface of the tube 10 with the braid angle, that is the angle between crossing strands in the braid pattern, being between 10° and 85°. A braid angle 25° is preferred. The braiding of the strands imparts great strength to the inner overwrap 12 and hence strengthens the tube 10. The braid may be in one ply or multiple plies, depending on the strength desired. To increase the rigidity of the overwrap 12, the fibrous strands thereof may be impregnated with and embedded in a resinous, elastomeric or polymeric material which is subsequently cured or polymerized. These materials are usually applied to fibrous strands in liquid form and under substantial pressure so as to achieve a thorough impregnation of the strands. Thereafter, the resinous or polymeric materials may be cured or polymerized by heating, in which case they set up and form a strengthening matrix for the strands. Suitable resinous and polymeric materials are epoxy, silicone, polyurethane, polysulfide, fluorosilicone, and fluorocarbon. An acceptable method for braiding the fibrous strands about the tube 10 and for embedding the braid in a resin matrix is disclosed in U.S. Pat. No. 3,586,058.

Surrounding the inner overwrap 12 is a layer 14 of sealant material, and this material is preferably maintained in a state of compression so that it quickly reverts to its original shape when punctured. The sealant material may be a polymeric material and should react with the fuel carried by the line A in such a manner that it swells and tends to seal off any puncture therein. Natural rubber and non-fuel resistant silicone rubber, such as the dimethyl silicone rubbers, are suited for this purpose. These rubbers do not remain stable in the presence of typical hydrocarbon fuels such as gasoline, kerosene and jet fuels, but on the contrary, become tacky and swell. Sealants of the foregoing nature usually are quite dense, ranging in density from 30–95 lbs./ft.$^3$.

The sealant layer 14, in turn, is surrounded by another overwrap 16 which not only maintains the sealant layer 14 in place, but also maintains it in a state of compression. The outer overwrap 16 is formed from strands or roving of high strength fibrous material, and the fibrous material of the inner overwrap 12 is ideally suited for the outer overwrap 16. The strands of the outer overwrap 16 are braided about the sealant layer 14 with the braid being quite tight to place the sealant in a condition of precompression. The braid may be in one or more plies. Braid angles between 10° and 85° are acceptable with 25° being preferred. The fibrous material of the overwrap 16 is embedded in a resinous, elastomeric or polymeric material such as epoxy, silicone, fluorosilicone, polyurethane, polysulfide, or fluorocarbon, and this material forms a firm matrix for the strands. Actually, the resinous or polymeric material is applied to the braided strands in liquid form to achieve a thorough penetration. Thereafter, the material may be cured or polymerized by heating. U.S. Pat. No. 3,586,058 discloses a suitable process for forming the overwrap 16.

The outer overwrap 16 therefore holds the sealant layer 14 in place about the inner overwrap 12, maintains the sealant layer 14 in a state of precompression, retains the sealant material at and around a puncture in the sealant layer 14, and protects the sealant layer 14 from external objects as well as from external fuel and oil contamination.

Should a projectile penetrate the fluid line A and in so doing pass through the hollow interior thereof (FIG. 2), two ruptures will occur within the wall of the fluid line A, one where the projectile enters and the other where the projectile exits. At the entry hole the sealant layer 14 will be sliced by the projectile and placed under greater compression for an instant, while the material of the tube 10 will be displaced inwardly. In other words, the petalling of the tube 10 will occur on the interior side of the tube 10 so that the sealant layer 24 will not be spread away from the entry hole. Thereafter, the sealant of the layer 14 will revert to its original shape and the fuel of course will tend to flow outwardly. Upon contacting the sealant of the layer 14, the fuel will cause that sealant to swell, thereby further comprising the sealant at the rupture and insuring against the loss of fuel. The braided strands of the overwraps 16 and 12 will for the most part spread to allow the projectile to pass into the fuel line A and will thereafter tend to assume their original shape. Thus, the outer overwrap 16 will continue to support the sealant and maintain it in a state of compression at the puncture.

At the exit hole left by the penetrating projectile, the wall of the tube 10 will be displaced outwardly, and metal petals will be projected perpendicular to the tube surface. However, the inner overwrap 12, being formed from strong fibrous strands, will reduce the distorting effect to a minimum and will prevent the metal from entering the sealant 14 any significant amount. Stated differently, the inner overwrap 12 strengthens and rigidifies the tube 10, particularly in radial directions, and hence petalling and distorting are kept to a minimum. Consequently, the sealant layer 14 at the exit hole is not spread to any significant extent and reverts to its initial shape upon the departure of the projectile. In addition, the fuel flows out of the exit hole in the tube 10, and this causes the sealant to swell and tightly seal off the hole. The fibers of the outer overwrap, 16 tend to spread as the projectile leaves the fluid line A and thereafter revert partially to their original position to provide support for the sealant 14 in the vicinity of the exit hole.

Since the inner overwrap 12 substantially reduces the amount of petalling into the sealant layer 14, the sealant layer 14 need not have substantial thickness to accommodate petalling. On the contrary, it need only be thick enough to seal the hole left by the exiting projectile. The inner overwrap 12 assumes the function of much of the high density sealant in conventional fuel lines, but is considerably lighter and thinner than the sealant material it replaces, and as a result the diameter and weight of the fuel line A is reduced considerably. Moreover, since the inner overwrap 12 reinforces the tube 10 and reduces distorting thereof, the walls of the tube 10 need not be as thick as the walls of tubes in conventional fuel lines.

Figure 3:
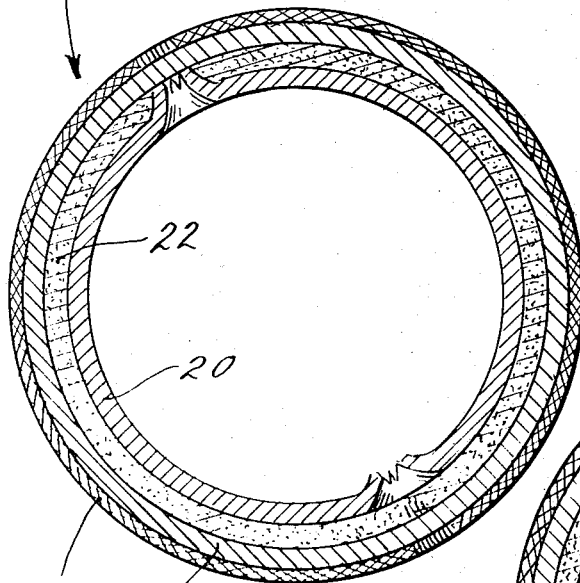
FIG. 3 is a sectional view of a modified hollow body.

A modified fluid line B (FIG. 3) has a hollow interior wherein the fluid is contained, and this interior is defined by a thin walled inperforate core or tube 20 which is similar to the tube 10.

The tube 20 is surrounded by a layer 22 of low density foam material. In addition to possessing low density, the foam material should be flexible at normal operating temperatures for the fuel line B, should be of the closed cell variety to prevent it from absorbing fuel, should possess a reasonable amount of structural integrity or strength as well as toughness, and further should be capable of absorbing impacts. Suitable foam materials are polypropylene, fluorocarbon, ethylene propylene rubber, polyethylene, acrylonitrile-butadiene-styrene co-polymers, vinyl chloride and vinyl chloride-vinyl acetate co-polymers and polyurethane foam which have a density of only about 3 lbs./ft.$^3$. The foam layer 22 should further be thick enough to accommodate petalling of the tube 20.

Surrounding the layer of foam 22 is a layer 24 of sealant material which is the same as the sealant material 24 for the fluid line A. The thickness of the layer 24 should be adequate to close any hole resulting from a projectile passing through the fluid line B.

To prevent fuel from seeping between the tube 20 and the layer of foam 22, a film of adhesive or sealant may be interposed between the two of them. Likewise, a film of adhesive or sealant should be placed between the foam layer 22 and the sealant layer 24 for the same purpose. The adhesive or sealant may be of the silicone, fluorosilicone, fluorocarbon, polysulfide, polyurethane, rubber or nitrile-phenolic varieties.

The sealant layer 24 in turn is encased in an overwrap 26 which comprises fibrous roving or strands braided about the sealant layer 24 and embedded in a resinous or polymeric material. The overwrap 26 serves to maintain the sealant layer 24 in place as well as protect it, and further is tightly braided about the sealant layer 24 to maintain that sealant layer in a state of compression. The overwrap 26 is the same as the overwrap 16.

A projectile entering the fluid line B will initially pass through the outer overwrap 26 and thence into the sealant layer 26 and the foam layer 22. Thereafter, it will pass through the wall of the tube 20, causing that wall to flare or petal inwardly. The sealant of the layer 24 will close behind the projectile and seal the entry hole. Moreover, the fuel will flow outwardly through the entry hole in the tube 20 and will contact the sealant of the layer 24 which will thereupon swell and tightly seal the entry hole. While the projectile will rupture some of the fibers of the overwrap 26, there will also be a tendency for those fibers to spread and thereafter assume their original position to hold the sealant of the layer 24 in place and in compression. The adhesive or sealant between the layer 22 of foam and the outer surface of the tube 20 prevents the fuel from flowing between the two. Likewise, the adhesive or sealant between the foam layer 22 and sealant layer 24 prevents the fuel from flowing between those two layers. The foam layer 22, being formed from a closed cell foam, does not absorb the fuel.

The same projectile will of course leave the fluid line B on the opposite side thereof and in leaving will initially pass through the wall of the tube 20. In so doing, the tube 20 will flare or petal outwardly into the low density layer of foam 22. Indeed, the layer of foam 22 is thick enough to accommodate substantially all the petalling so that none of the sealant in the layer 24 is held away from the exit hole by the petalled metal. Consequently, after the projectile leaves the fluid line B, the sealant of the layer 24 will close upon itself and seal the exit hole, and the fuel which contacts the sealant through the opening created in the low density foam layer 22 by the petals will cause the sealant to swell, thus sealing the exit hole even tighter. As on the entry side, the outer overwrap 26 at the exit hole will to a limited extent spread as the projectile passes through it and thereafter will revert somewhat to its original position to retain the sealant of the layer 24 in place at the exit hole.

In contrast to conventional fuel lines where the petalling is accommodated by the sealant itself, in the fluid line B the petalling is accommodated by the layer of foam material 22. Since the foam material is much lighter in weight than the sealant, the fluid line B is likewise considerably lighter than conventional fluid lines.

In lieu of having a separate foam layer 22 and a sealant layer 24 between the tube 20 and the outer overwrap 26, the fuel line B may be provided with a single foam layer capable of sealing itself after being penetrated by a projectile. That foam layer should be thick enough to accommodate petalling of the tube 20 and yet leave enough material beyond the petalling to effect a seal of the rupture. In addition, the foam material should be flexible, should be of the closed cell variety, should react in the presence of conventional hydrocarbon fuels to produce a swelling, should be sufficiently tough so as not to be torn or shattered when penetrated by the projectile, and should be able to withstand operational temperatures. Suitable foam materials for use between the tube 20 and the braided overwrap 26 are natural and synthetic rubbers, and silicone and ethylene propylene rubber. Naturally, a fuel line of the foregoing construction is extremely light in weight.

Figure 4:
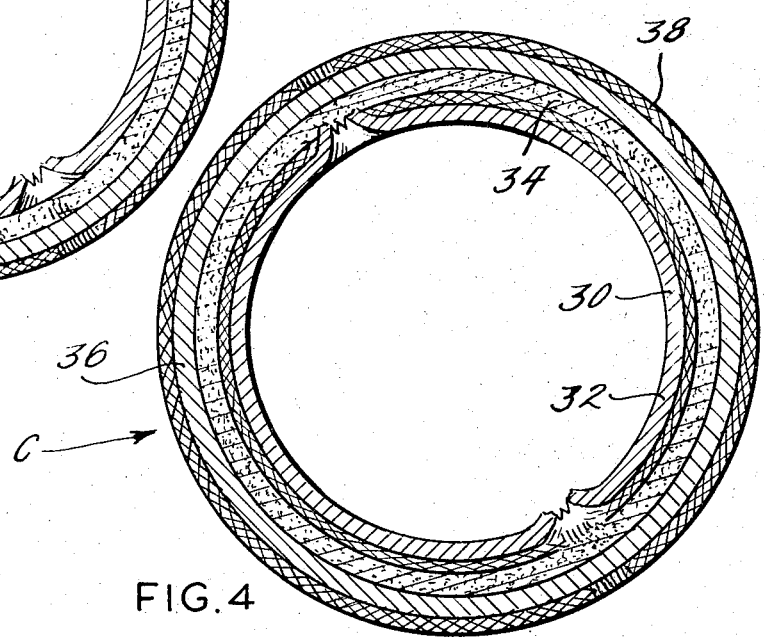
FIG. 4 is a sectional view of still another modified hollow body.

Another modified fuel line C (FIG. 4) is in effect a combination of the fuel lines A and B. Like both the fuel lines A and B, the fuel line C has a core or tube 30 through which the fuel flows. The fuel line C resembles the line A in that the tube 30 is surrounded by an inner overwrap 32 of braided fibrous material which may or may not be embedded in a resinous or polymeric material. The overwrap 32 in turn is surrounded by a layer 34 of foam material similar to the layer 22 of the fluid line B. Surrounding the layer of foam material 34 is a layer 36 of sealant, and that sealant layer 36 is encased within a braided fibrous overwrap 38, the strands of which are embedded within a resinous or polymeric matrix to impart rigidity and strength thereto. A film of adhesive or sealant may be interposed between the overwrap 32 and the foam layer 34 and between the foam layer 34 and the sealant layer 36 to prevent the fuel from flowing along those layers.

While the invention has been disclosed in conjunction with fuel lines, it should be noted that it is also applicable to other types of hollow bodies such as fuel tanks and all other containers for the storage and/or transmission of fluids.

This invention is intended to cover all changes and modifications of the example of the invention herein chosen for purposes of the disclosure which do not constitute departures from the spirit and scope of the invention.

What is claimed is:

1. A self-sealing hollow body for containing a liquid fuel, said hollow body comprising: a hollow substantially rigid imperforate core which is formed from metal and defines a cavity in which fuel is contained; first strands of nonmetallic fibrous material braided directly over and around the metal core to reinforce the core so as to reduce outward petalling and distortion of the core when the core is penetrated by a projectile; a first matrix-forming material impregnating the braid formed by the first strands; a spacer layer of light weight material encircling the impregnated braid formed by the first strands and first matrix-forming material for accommodating petalling of the metal core when the core is penetrated by a projectile; a sealant layer encircling the spacer layer, the sealant layer being capable of reacting with fuel to swell so as to close a puncture in the fuel line and thereby prevent fuel from escaping; second strands of nonmetallic fibrous material braided tightly around the sealant layer such that the sealant is placed in a state of precompression as the second strands are applied, whereby the second strands maintain the sealant in place and in a state of precompression; and a second matrix-forming material impregnating the braid formed by the second strands; the impregnated braid formed by the second strands and second matrix-forming material being exposed outwardly to form the outer surface of the hollow body.

2. A hollow body according to claim 1 wherein the spacer layer is a foam material.

3. A hollow body according to claim 1 and further characterized by a first adhesive layer between the spacer layer and the impregnated braid formed by the first strands and the first matrix-forming material.

4. A hollow body according to claim 33 and further characterized by a second adhesive layer between the spacer layer and the sealant layer.

5. A self-sealing hollow body for containing a liquid fuel, said hollow body comprising: a hollow substantially rigid imperforate core which is formed from metal and defines a cavity in which fuel is contained; first strands of nonmetallic fibrous material braided directly over and around the metal core to reinforce the core so as to reduce outward petalling and distortion of the core when the core is penetrated by a projectile; a spacer layer of light-weight material encircling the braid formed by the first strands for accommodating petalling of the metal core when the core is penetrated by a projectile; a sealant layer encircling the spacer layer, the sealant layer being capable of reacting with fuel to swell so as to close a puncture in the fuel line and thereby prevent fuel from escaping; second strands of nonmetallic fibrous material braided tightly around the sealant layer, whereby the second strands maintain the sealant in place; and a matrix-forming material impregnating the braid formed by the second strands.

* * * * *

UNITED STATES PATENT OFFICE
CERTIFICATE OF CORRECTION

Patent No. 3,830,261                    Dated August 20, 1974

Inventor(s) Marvin S. Hochberg, et al

It is certified that error appears in the above-identified patent and that said Letters Patent are hereby corrected as shown below:

Column 6, line 66 (Claim 4), the numeral "33" should be --- 3 ---.

Signed and sealed this 3rd day of December 1974.

(SEAL)
Attest:

McCOY M. GIBSON JR.                    C. MARSHALL DANN
Attesting Officer                       Commissioner of Patents